United States Patent
Itoh

[11] 4,196,968
[45] Apr. 8, 1980

[54] WIDE ANGLE ZOOM LENS SYSTEM

[75] Inventor: Takayuki Itoh, Tokyo, Japan

[73] Assignee: Asahi Kogaku Kogyo Kabushiki Kaisha, Tokyo, Japan

[21] Appl. No.: 901,863

[22] Filed: May 1, 1978

[30] Foreign Application Priority Data

Apr. 30, 1977 [JP] Japan ................................. 52-50551

[51] Int. Cl.² .............................................. G02B 15/16
[52] U.S. Cl. .................................... 350/184; 350/189
[58] Field of Search ........................ 350/184, 186, 189

[56] References Cited

U.S. PATENT DOCUMENTS

| 4,142,779 | 3/1979 | Ogawa | 350/184 |
| 4,153,339 | 5/1979 | Tajima | 350/184 |

Primary Examiner—Conrad J. Clark
Attorney, Agent, or Firm—Sughrue, Rothwell, Mion, Zinn and Macpeak

[57] ABSTRACT

A miniaturized, super-wide angle zoom lens system of the two lens group type wherein barrel shaped distortion aberration in the wide angle position is compensated for by providing one of the lenses with an aspherical surface.

4 Claims, 17 Drawing Figures

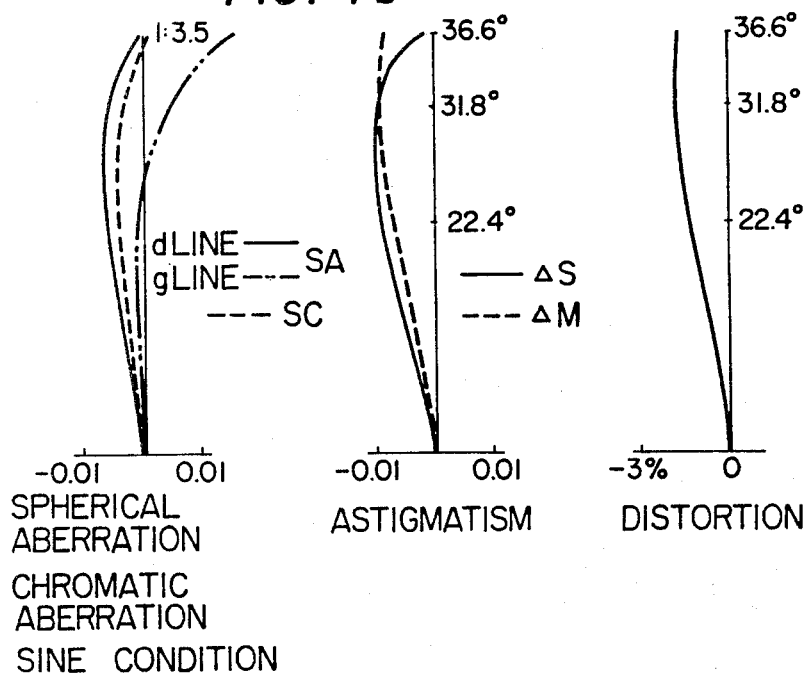
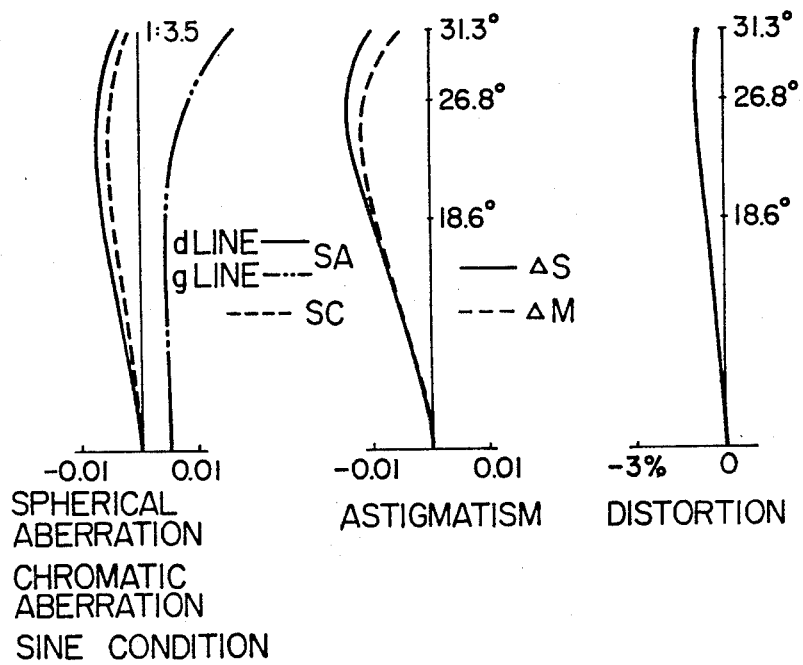

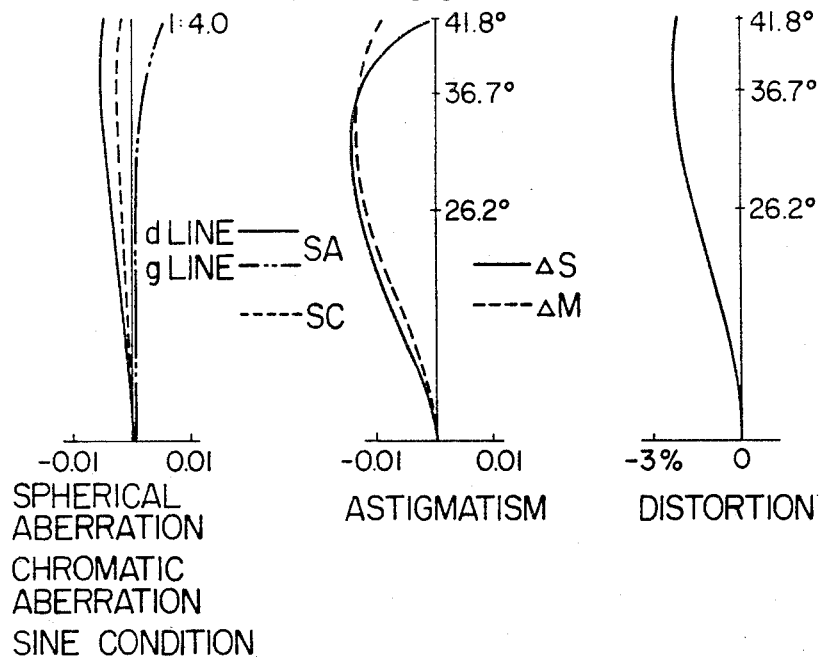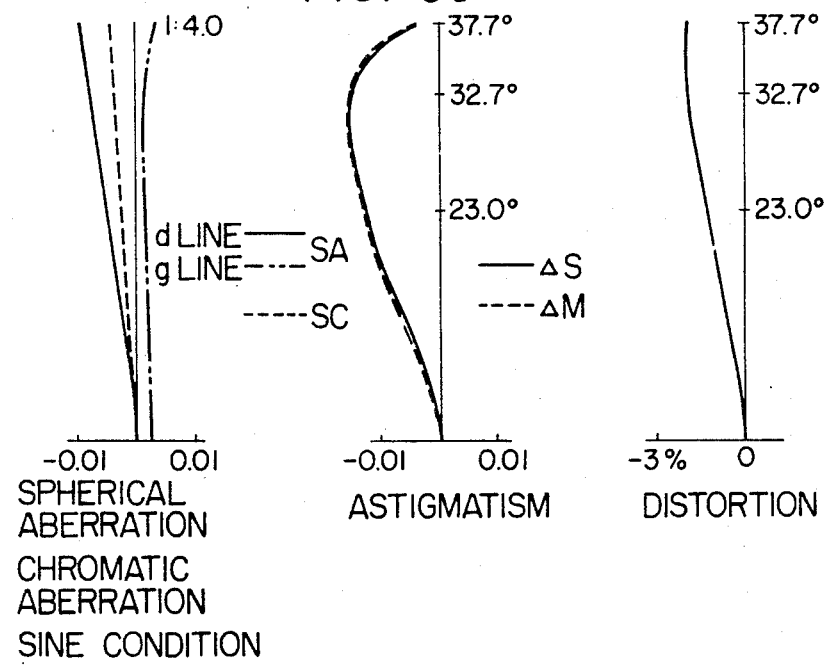

WIDE ANGLE ZOOM LENS SYSTEM

BACKGROUND OF THE INVENTION

This invention relates to a miniaturized zoom lens system having a super wide viewing angle of 84° or 94° and good compensation for various aberrations. These criteria are achieved by, inter alia, providing one of the lenses with an aspherical surface.

The lens system of the present invention is a so-called two lens group type of zoom lens system comprising a first divergent lens group and a second convergent lens group. The movement characteristics of the two lens groups are illustrated in FIG. 1, where $f_1$ ($f_1<0$) is the focal length of the first lens group, $f_2$ ($f_2>0$) is the focal length of the second lens group, and $l$ is the distance between the first and second lens groups. The relation of these parameters to the overall focal length f is as follows:

$$\frac{1}{f} = \frac{1}{f_1} + \frac{1}{f_2} - \frac{l}{f_1 f_2} \qquad (1)$$

The back focal length $f_B$ is given by:

$$f_B = f_2 - \frac{f_2}{f_1} f \qquad (2)$$

From equation (1):

$$\frac{dl}{df} = \frac{f_1 f_2}{f^2} < 0 \qquad (3)$$

From equation (2):

$$\frac{df_B}{df} = -\frac{f_2}{f_1} = \text{constant number} > 0 \qquad (4)$$

The overall length L is:

$$L = l + f_B \qquad (5)$$

From equations (3), (4) and (5):

$$\frac{dL}{df} = \frac{f_1 f_2}{f^2} - \frac{f_2}{f_1} \qquad (6)$$

In equation (6), if $dL/df = 0$, then $$f = |f_1| \qquad (7)$$

From equation (3), the distance l between the first and second lens groups is longest in the wide angle position, and the longer the overall focal length f the shorter the distance l becomes. From equation (4), the back focal length $f_B$ has a minimum value in the wide angle position, and the longer the overall focal length the longer the back focal length proportionately becomes. From equation (7), the overall length L has a minimum value when the overall focal length f is equal to the absolute value $|f_1|$ of the focal length of the first lens group. Accordingly, whenever the overall focal length f is longer or shorter than $|f_1|$, the overall length L becomes longer.

From the above analysis, since the distance l between the first and second lens groups becomes longest at the wide angle position, the aperture of the first lens group tends to increase as the viewing angle widens. This tendency is effective to extremely widen the viewing angle. If the miniaturization of the lens system is unreasonably compatible with widening the viewing angle to a super-wide angle, the barrel shaped distortion aberration in the wide angle position is abrupty increased, and it is impossible to compensate for this aberration by using a spherical lens system.

SUMMARY OF THE INVENTION

In order to overcome the above defect, the present invention provides a miniaturized zoom lens system in which the barrel shaped distortion aberration in the wide angle position is compensated for by using a single aspherical lens, and various other aberrations are also compensated for throughout the overall zoom range.

BRIEF DESCRIPTION OF THE DRAWINGS

In the drawings:

FIGS. 7(a) to 7(c) show the aberration conditions of Example 3, FIGS. 9(a) to 9(c) show the aberration conditions of Example 4.

In FIGS. 4 and 8, $r_i$ is the radius of curvature of the i-th lens surface, and $d_i$ is the thickness of the lens or the space between adjacent lens surfaces.

DETAILED DESCRIPTION OF THE PREFERRED EMBODIMENTS

Figure 1:
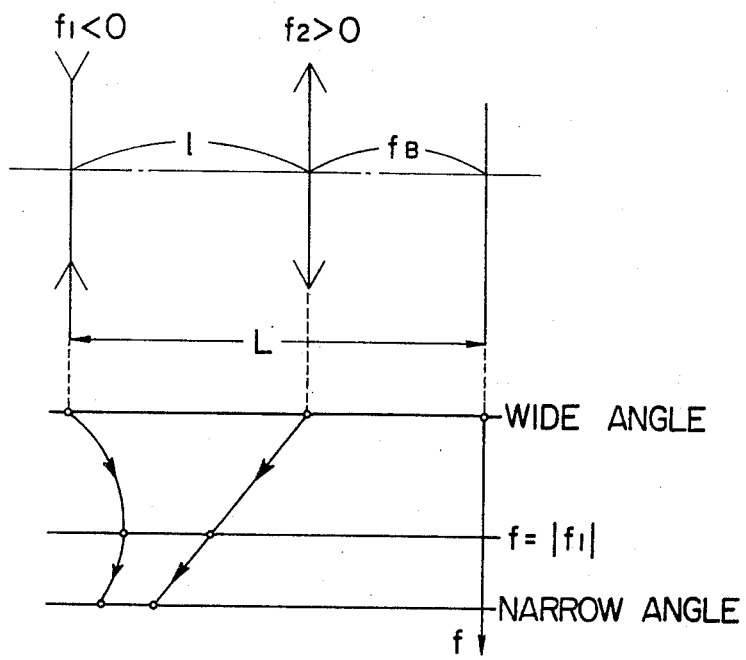
FIG. 1 illustrates the lens group movement characteristics of a zoom lens system according to the present invention.

The zoom lens system of the present invention is composed of a first divergent lens group and a second convergent lens group. The overall focal length is varied by the relative mechanical movement of the first and second lens groups, and at the same time the image focus is maintained constant. The first divergent lens group comprises at least two positive lenses and at first two negative lenses, and includes, in order from the object side, a positive lens having convex surface facing the object, a negative lens group, and a positive meniscus lens having a convex surface facing the object. The second convergent lens group comprises at least two positive lenses in its end units facing both the object and image sides, and includes positive, negative and positive lens units or positive, negative, positive, negative and positive lens units. Further, a single aspherical surface is provided either on an arbitrary surface (the i-th surface) of the first lens group of on an arbitrary surface (the j-th surface) of the second lens group. The overall zoom lens system must satisfy the following conditions:

$$f_W < |f_1| < 1.5 f_T. \qquad (1)$$

$$0.4 < l_W/f_W < 1.0. \qquad (2)$$

$$3.0 < L/f_W < 6.0, \quad (3)$$

if $K = i$ or $j$ (the K-th surface is aspherical), $$0 < |\phi_K| < 0.35, \quad (4)$$

where: $\phi_i > 0$ and $\phi_j < 0$, $$0 < |h_{WK}{}^2 \overline{h}_{WK}{}^2 \phi_K| < 0.2, \quad (5)$$

and $$-0.2 < h_{WK} \overline{h}_{WK}{}^3 \phi_K < 0, \quad (6)$$

wherein:
- $f_1$ is the focal length of the first lens group,
- $f_W$ is the focal length in the wide angle position,
- $f_T$ is the focal length in the telescopic or narrow angle position,
- $l_W$ is the distance between the first and second lens groups in the wide angle position,
- L is the maximum overall length,
- $\phi_K$ is the solid or cubic aspherical coefficient,
- $h_{WK}$ is the height of the parallel light beam near the optical axis passing through the K-th surface in the wdie angle position and limited by the stop diaphragm, and
- $\overline{h}_{WK}$ is the height of the angled light beam passing through the center of the stop diaphragm in the wide angle position in the K-th lens surface.

To prevent the aperture of the first lens group from increasing as the overall length is shortened, a positive lens having a convex surface facing the object is disposed at the front or object side of the first divergent lens group. To prevent various aberrations when focusing on a small object, a positive meniscus lens having a convex surface facing the object is disposed at the final or end position on the image side in the first lens group.

To prevent variations of and increases in the spherical aberration when the focal length is varied, at least two positive lenses are positioned on the object side in the second convergent lens group, and to prevent variations of and increases in the astigmatism aberration and the image distortion, at least two positive lenses are positioned on the image side therein.

Conditions (1) and (2) above relate the power of the lens system. As previously mentioned, the overall length L is maximum when the overall focal length f is equal to the absolute value $|f_1|$ of the focal length of the first lens group. Accordingly, the power of the first lens group is defined throughout the zoom range from $f_W$ to $f_T$ and at its peripheral ends to miniaturize the maximum length of the zoom lens system, as specified in Condition (1). If the value of $|f_1|$ decreases below the minimum limiting value, the power of the first lens group becomes too strong to enable adequate compensation for the various aberrations and distortions. Conversely, if $|f_1|$ exceeds the maximum limiting value, although the various aberrations can be easily compensated, the amount of zoom movement increases to thereby enlarge the overall lens system and work against miniaturization.

The maximum value of Condition (2) also defines a miniaturization limit. Below the minimum value of Condition (2), the back focal length is shortened and the zoom ratio becomes too small. To overcome this defect the power of the first lens group must be increased, but this leads to difficulties in compensating for various aberrations and distortions as mentioned above.

Condition (3) is derived from Conditions (1) and (2), and relates to the maximum length of the lens system. Above the maximum aberration compensation is easily achieved, but the length is imcompatible with miniaturization. Below the minimum value the powers of the first and second lens groups become too strong, aberration compensation is difficult, and the zoom ratio must be reduced.

Figure 2:
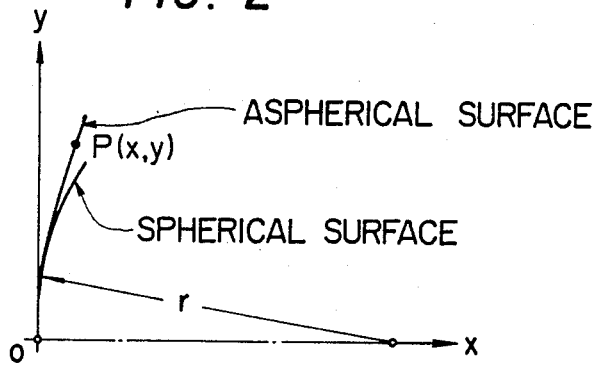
FIG. 2 illustrates the definition of the aspherical surface.

Conditions (4), (5) and (6) relate to the shape or configuration of the aspherical surface. This will be illustrated with reference to FIGS. 2 and 3. In FIG. 2 the vertex of the aspherical surface is the origin O, and the X-axis is coincident with the direction of light propagation. The coordinates (x, y) of a point P on the aspherical surface is defined as follows:

$$x = \frac{Cy^2}{1 + \sqrt{1 - C^2 y^2}} + A_1 y^4 + A_2 y^6 + A_3 y^8 + A_4 y^{10} + \ldots \quad (8)$$

where C is the curvature near the optical axis (the reverse number of the radius of curvature).

The first term of equation (8) depends only on the curvature C near the axis. The second and following terms define the aspherical gradient. The coefficient $A_1$ of the second term is related to the coefficient $\phi$ of the solid or cubic aspherical surface as follows:

$$\phi = 8(N' - N)A_1,$$

where
- N is the refractive index of the medium before the aspherical surface, and
- N' is the refractive index of the medium after the aspherical surface.

The aspherical surface coefficient relates to the solid or cubic aberration coefficient in the theory of aberrations, and requires that the following amounts of aberration variations be considered in using the aspherical surface:

$$\Delta I = h^4 \phi,$$

$$\Delta II = h^3 \overline{h} \phi,$$

$$\Delta III = h^2 \overline{h}^2 \phi,$$

$$\Delta IV = h^2 \overline{h}^2 \phi, \text{ and}$$

$$\Delta V = h \overline{h}^3 \phi,$$

where:
- I is the spherical coefficient,
- II is the coma aberration coefficient,
- III is the astigmatism aberration coefficient,
- IV is the spherical deficiency surface curve aberration coefficient,
- V is the distortion aberration coefficient, and
- h and $\overline{h}$ are the amounts of tracking near the axis.

Figure 3:
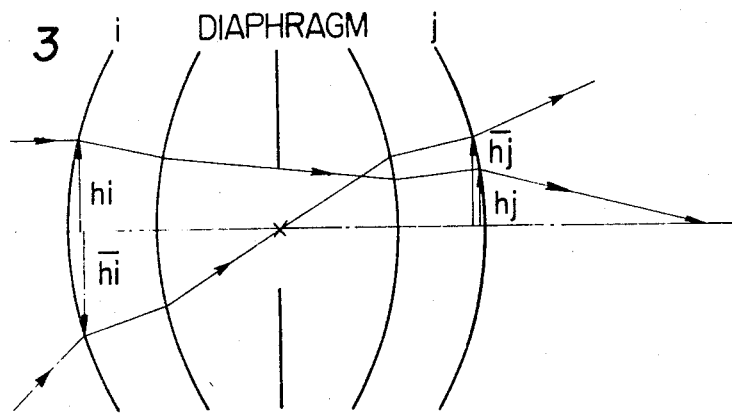
FIG. 3 illustrates the passage of parallel and angled light beams through the lens system.
Figure 4:
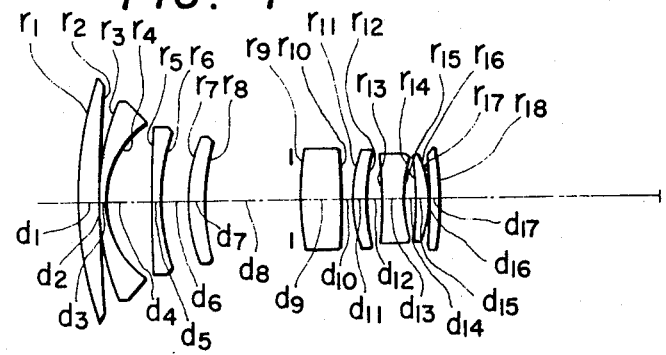
FIG. 4 shows a zoon lens system contstruction corresponding to Examples 1-3 in the wide angle position.
Figure 5A:
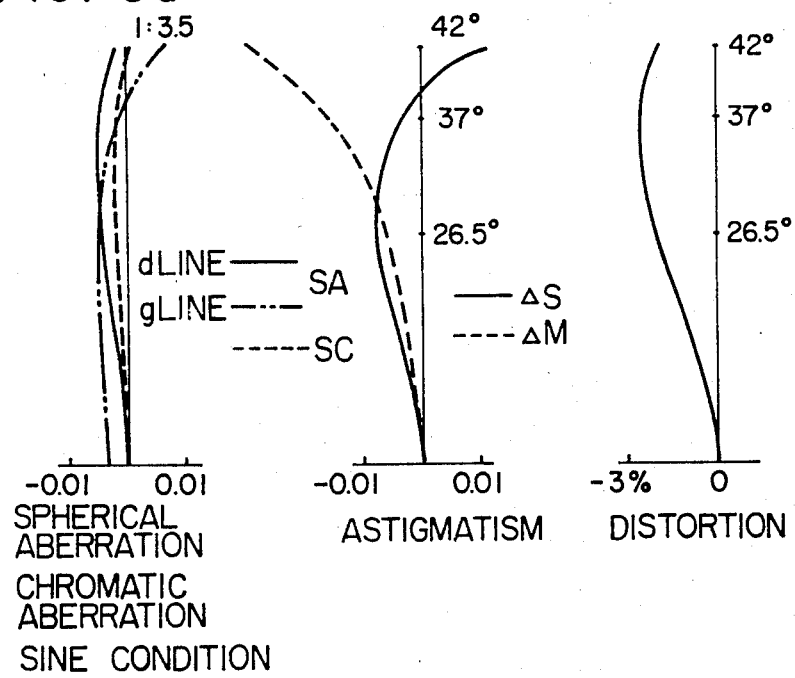
FIGS. 5(a) to 5(c) show the aberration conditions of Example 1.
Figure 5B:
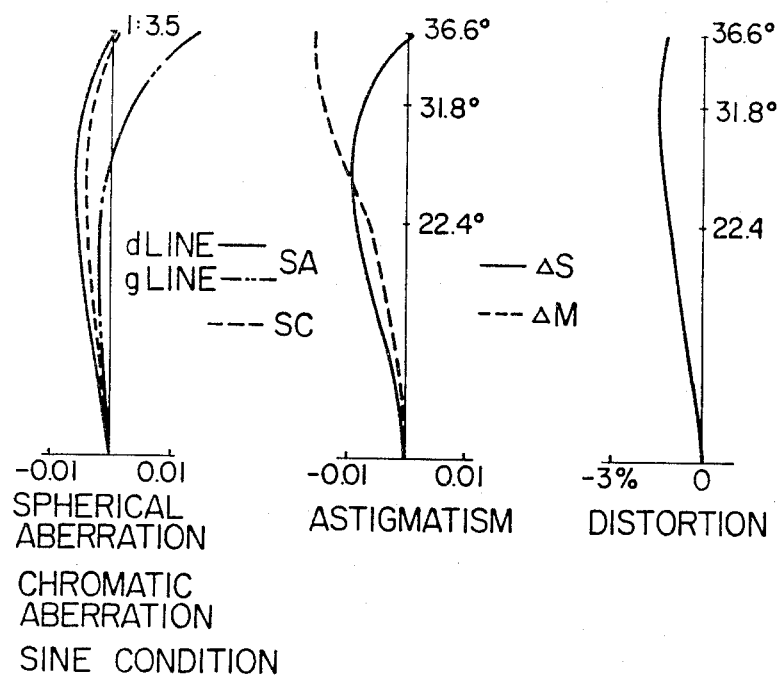
Figure 5C:
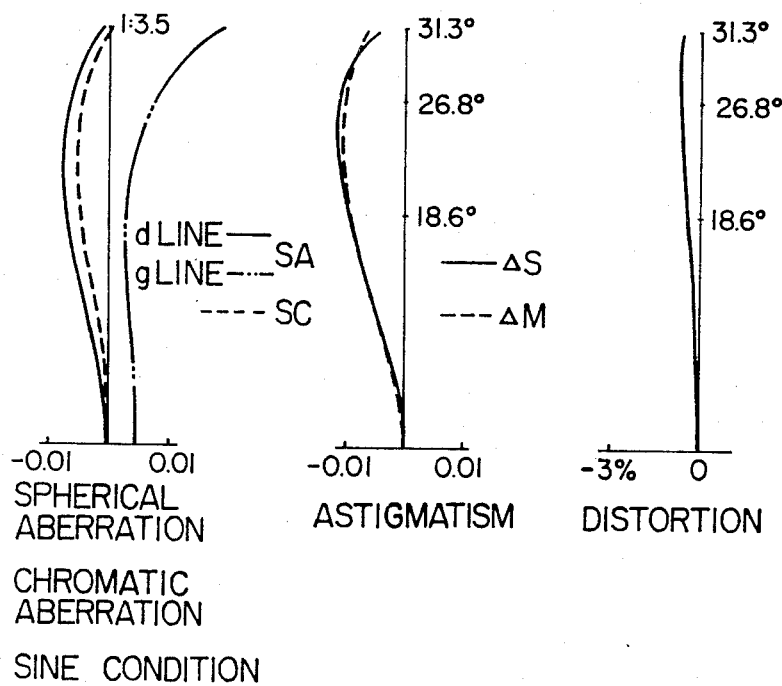
Figure 6A:
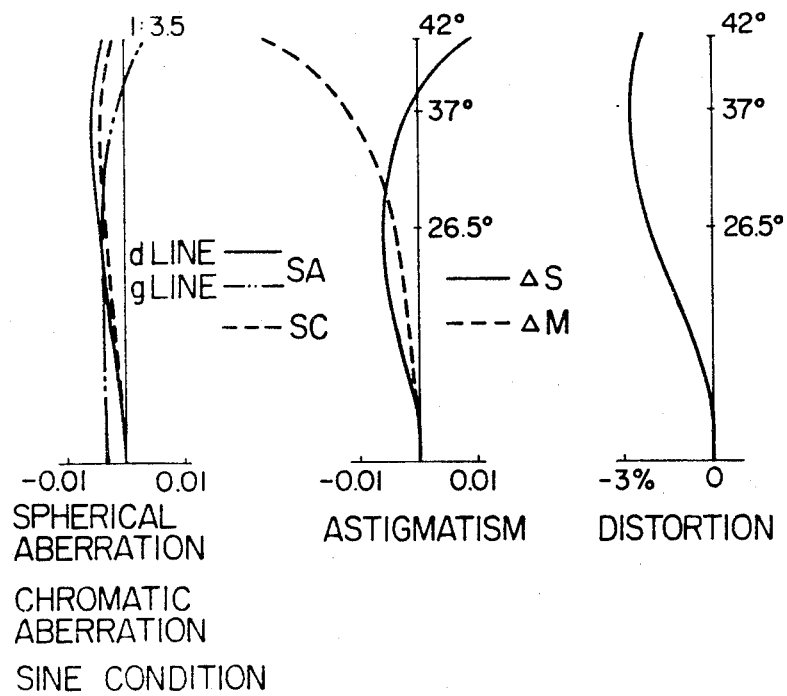
FIGS. 6(a) to 6(c) show the aberration conditions of Example 2.
Figure 6B:
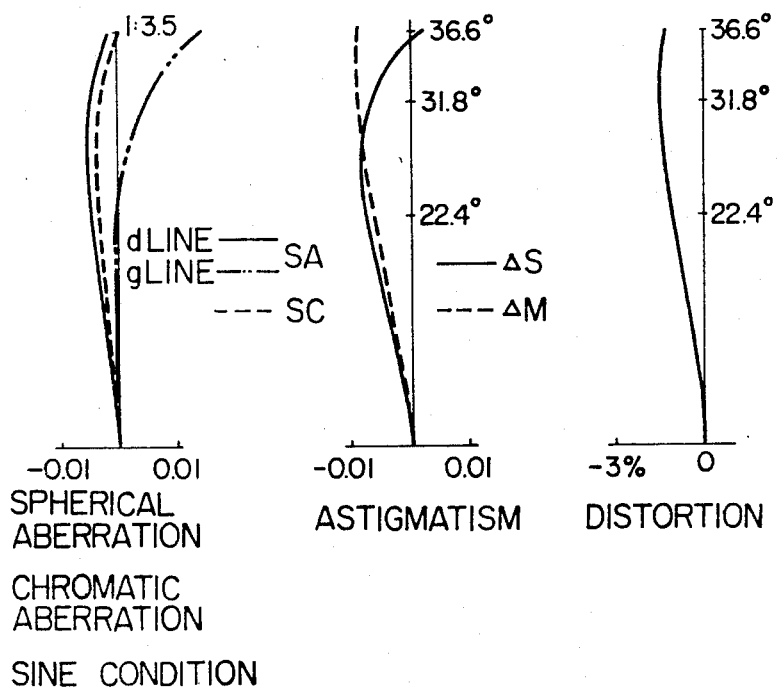
Figure 6C:
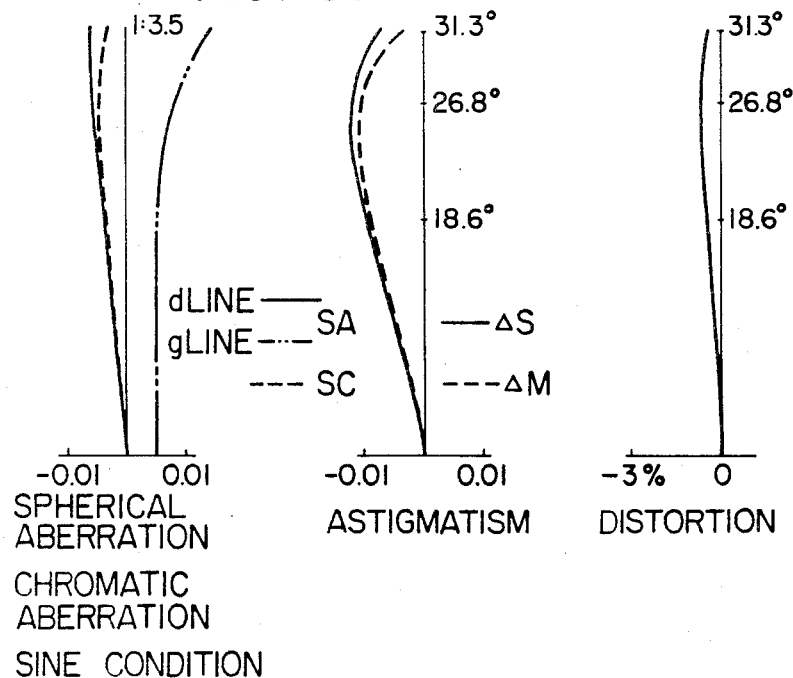
Figure 7A:
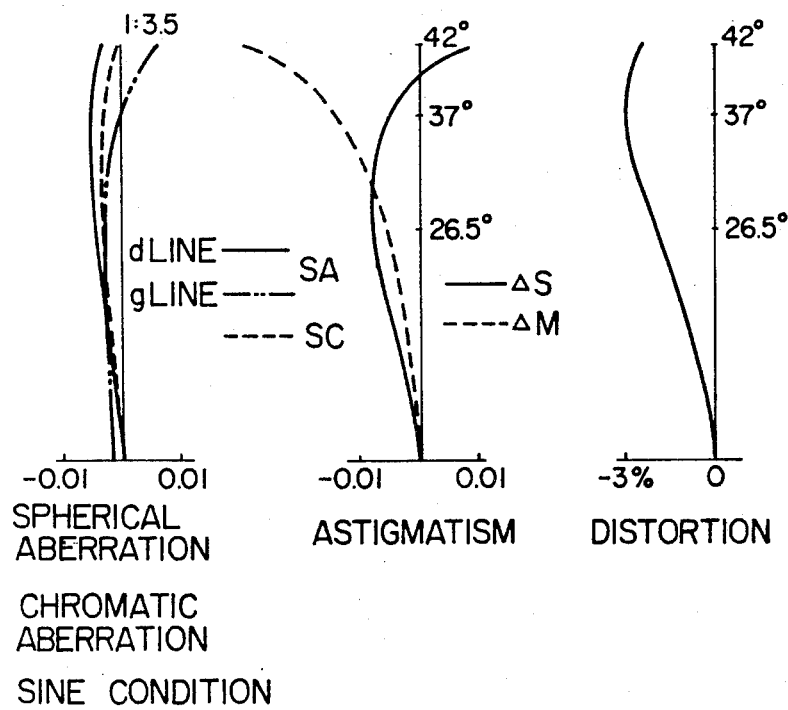
Figure 8:
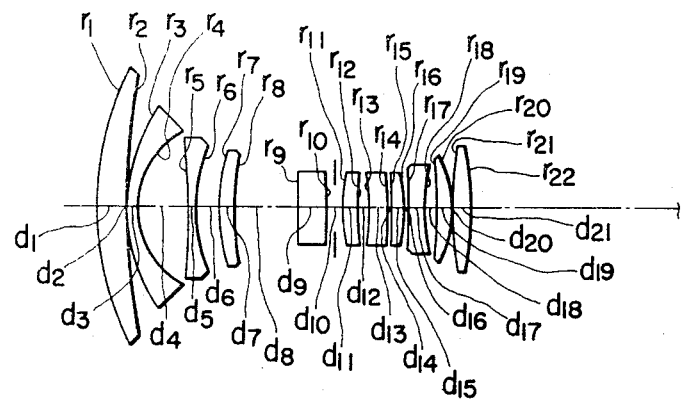
FIG. 8 shows a zoom lens system construction corresponding to Example 4 in the wide angle position.
Figure 9A:
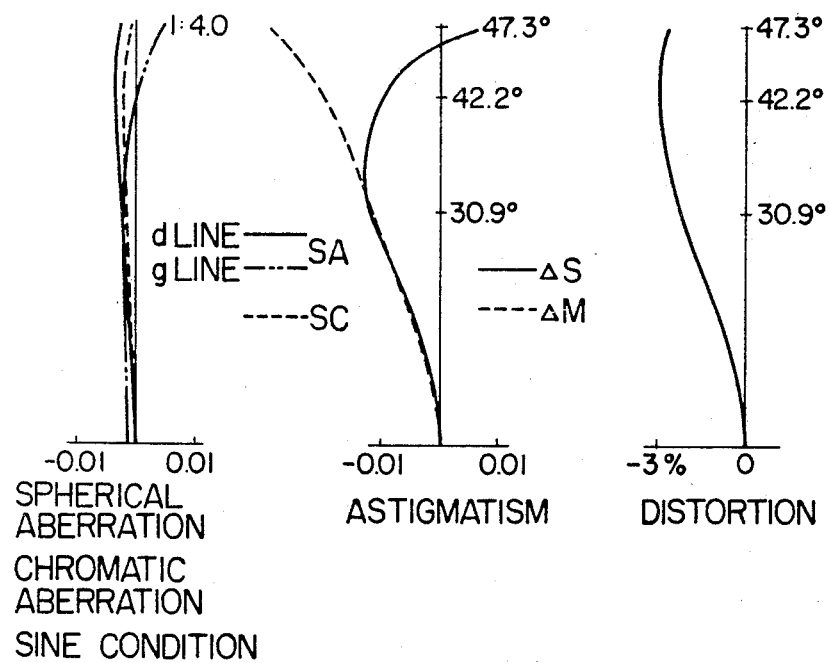

The term h represents the height of the focused image on the optical axis formed by the light beam passing through each lens surface in parallel with the optical axis as shown in FIG. 3.

The term $\overline{h}$ is the vertical distance from the optical axis to the intersection of each lens surface with the slanting light beam which passes through the center of the stop diaphragm.

Conditions (4), (5) and (6) result in the barrel shaped distortion aberration being well compensated for by the single aspherical lens surface.

In Condition (4), when the aspherical surface is disposed in the first lens group the stipulation that $\phi_i > 0$ applies; when the aspherical surface is disposed in the second lens group $\phi_j < 0$ applies. If the value $|\phi_K|$ exceeds the maximum limit, as the viewing angle becomes large the compensation of the distortion aberration becomes excessive. This leads to an increase in the amount of distortion turning, and hence to difficulty in compensating for astigmatism and image distortion.

Condition (5) relates to the astigmatism aberration and the image distortion. Above the maximum value, when the aspherical surface is positioned in the first lens group the image surface is too under-compensated, while when the aspherical surface is positioned in the second lens group the image surface is too over-compensated.

Condition (6) relates to the distortion aberration. Below the minimum value, as the viewing angle increases the distortion compensation becomes excessive and the amount of distortion turning increases. Also, it is difficult to compensate for the image curvature distortion.

The detailed parameters for four Examples of the present invention are listed below, wherein:

$\omega$ is the half-viewing angle, r is the radius of curvature, d is the thickness of the lens or the distance between adjacent lenses, N is the refractive index at the d-line, $\nu$ is the Abbé number, $A_1$, $A_2$, $A_3$ and $A_4$ are the aspherical coefficients, h is the height of the parallel light beam near the optical axis in the wide angle position, $\alpha$ is the angle of the near optical axis light beam in the wide angle position, $\bar{h}$ is the height of the angled light beam that passes through the center of the stop diaphragm in the wide angle position, and $\bar{\alpha}$ is the angle of the latter light beam in the wide angle position.

EXAMPLE 1

| | Surface No. | r | d | N | $\nu$ |
|---|---|---|---|---|---|
| | \multicolumn{5}{l|}{1 : 3.5 f = 1.0–1.46 $\omega$ = 42.0°–31.3°} |
| first lens group | 1 | 2.6088 | 0.1464 | 1.58913 | 61.1 |
| | 2 | 8.3383 | 0.0041 | | |
| | 3 | 2.0830 | 0.0488 | 1.79952 | 42.2 |
| | 4 | 0.6508 | 0.3091 | | |
| | 5 | 13.9462 | 0.0529 | 1.67790 | 50.7 |
| | 6 | 1.3168 | 0.1952 | | |
| | 7 | 1.0677 | 0.1114 | 1.80518 | 25.4 |
| | 8 | 1.9415 | 0.6480 | | |
| second lens group | 9 | 1.7490 | 0.2916 | 1.80610 | 40.9 |
| | 10 | −6.6348 | 0.0907 | | |
| | 11 | 0.8200 | 0.1041 | 1.80610 | 40.9 |
| | 12 | 2.6537 | 0.0936 | | |
| | 13 | −2.3505 | 0.1594 | 1.84666 | 23.9 |
| | 14 | 0.8293 | 0.0732 | | |
| | 15 | −8.5416 | 0.0915 | 1.51633 | 64.1 |
| | 16 | −0.9506 | 0.0041 | | |
| | 17 | 14.4470 | 0.0944 | 1.51633 | 64.1 |
| | 18 | −1.2857 | | | |

| focal length of the overall lens system | $d_8$ |
|---|---|
| 1.00 | 0.6480 |
| 1.20 | 0.3715 |
| 1.46 | 0.1268 |

The third surface is aspherical.

$A_1 = 0.975539 \times 10^{-2}$
$A_2 = 0.159788 \times 10^{-1}$
$A_3 = -0.839908 \times 10^{-2}$
$A_4 = -0.703569 \times 10^{-3}$ The stop diaphragm surface is positioned at 0.0407 before the ninth surface.

| Surface No. | h | $\alpha$ | $\bar{h}$ | $\bar{\alpha}$ |
|---|---|---|---|---|
| | | 0.000 | | −1.000 |
| 1 | 1.000 | 0.226 | −0.799 | −1.180 |
| 2 | 0.979 | 0.157 | −0.690 | −1.132 |
| 3 | 0.979 | 0.532 | −0.686 | −1.395 |
| 4 | 0.964 | −0.652 | −0.648 | −0.599 |
| 5 | 1.166 | −0.596 | −0.463 | −0.622 |
| 6 | 1.185 | −1.205 | −0.443 | −0.393 |
| 7 | 1.420 | −0.135 | −0.366 | −0.670 |
| 8 | 1.428 | −0.727 | −0.325 | −0.535 |
| Diaphram surface | 1.870 | −0.727 | 0.000 | −0.535 |
| 9 | 1.899 | 0.148 | 0.022 | −0.525 |
| 10 | 1.875 | 0.376 | 0.107 | −0.512 |
| 11 | 1.841 | 2.186 | 0.153 | −0.362 |
| 12 | 1.715 | 1.665 | 0.174 | −0.414 |
| 13 | 1.559 | 1.103 | 0.213 | −0.491 |
| 14 | 1.464 | −0.391 | 0.255 | −0.751 |
| 15 | 1.493 | −0.481 | 0.310 | −0.770 |
| 16 | 1.522 | 0.345 | 0.356 | −0.576 |
| 17 | 1.520 | 0.399 | 0.359 | −0.564 |
| 18 | 1.495 | 1.000 | 0.394 | −0.405 |

$f_1 = 1.376$
$l_{B'} = 0.6480$
$L = 4.014$
$\phi_3 = 0.062397$
$\Delta IV = 0.02814$
$\Delta V = -0.01972$

EXAMPLE 2

| | Surface No. | r | d | N | $\nu$ |
|---|---|---|---|---|---|
| | \multicolumn{5}{l|}{1 : 3.5 f = 1.0–1.46 $\omega$ = 42.0°–31.3°} |
| first lens group | 1 | 2.9614 | 0.1422 | 1.58913 | 61.1 |
| | 2 | 9.1414 | 0.0041 | | |
| | 3 | 1.8778 | 0.0488 | 1.80610 | 40.9 |
| | 4 | 0.6423 | 0.3088 | | |
| | 5 | 7.1790 | 0.0528 | 1.67790 | 50.7 |
| | 6 | 1.2023 | 0.1881 | | |
| | 7 | 1.1365 | 0.1219 | 1.80518 | 25.4 |
| | 8 | 2.2346 | 0.6412 | | |
| second lens group | 9 | 1.7117 | 0.2832 | 1.80610 | 40.9 |
| | 10 | −5.6534 | 0.0926 | | |
| | 11 | 0.8377 | 0.1016 | 1.80610 | 40.9 |
| | 12 | 2.6212 | 0.0913 | | |
| | 13 | −2.1878 | 0.1593 | 1.84666 | 23.9 |
| | 14 | 0.8525 | 0.0731 | | |
| | 15 | −8.3985 | 0.0914 | 1.51633 | 64.1 |
| | 16 | −0.9428 | 0.0041 | | |
| | 17 | −34.2275 | 0.0943 | 1.51633 | 64.1 |
| | 18 | −1.1567 | | | |

| focal length of the overall lens system | $d_8$ |
|---|---|
| 1.00 | 0.6412 |
| 1.20 | 0.3652 |
| 1.46 | 0.1209 |

The seventh surface is aspherical.
$A_1 = 0.252119 \times 10^{-1}$
$A_2 = 0.104986$
$A_3 = 0.200580$
$A_4 = -0.338823$ The stop diaphragm is arranged at 0.0488 before the ninth surface.

| Surface No. | h | α | h̄ | ᾱ |
|---|---|---|---|---|
|  |  | 0.000 |  | −1.000 |
| 1 | 1.000 | 0.199 | −0.788 | −1.157 |
| 2 | 0.982 | 0.136 | −0.684 | −1.113 |
| 3 | 0.982 | 0.557 | −0.680 | −1.405 |
| 4 | 0.967 | −0.656 | −0.642 | −0.599 |
| 5 | 1.169 | −0.546 | −0.457 | −0.642 |
| 6 | 1.186 | −1.215 | −0.437 | −0.396 |
| 7 | 1.415 | −0.212 | −0.363 | −0.652 |
| 8 | 1.429 | −0.727 | −0.318 | −0.539 |
| Diaphram Surface | 1.860 | −0.727 | 0.000 | −0.538 |
| 9 | 1.895 | 0.165 | 0.026 | −0.525 |
| 10 | 1.869 | 0.432 | 0.109 | −0.510 |
| 11 | 1.829 | 2.192 | 0.156 | −0.360 |
| 12 | 1.706 | 1.668 | 0.176 | −0.414 |
| 13 | 1.554 | 1.066 | 0.214 | −0.497 |
| 14 | 1.462 | −0.385 | 0.257 | −0.752 |
| 15 | 1.490 | −0.477 | 0.312 | −0.771 |
| 16 | 1.519 | 0.355 | 0.358 | −0.575 |
| 17 | 1.517 | 0.332 | 0.360 | −0.580 |
| 18 | 1.497 | 1.000 | 0.397 | −0.403 |

$f_1 = -1.375$
$l_{II'} = 0.6412$
$L = 3.995$
$\phi_7 = 0.16240$
$\Delta IV = 0.04284$
$\Delta V = -0.01099$

EXAMPLE 3

| 1:3.5 f = 1.0–1.46 ω = 42.0°–31.3° | | | | |
|---|---|---|---|---|
| Surface No. | r | d | N | υ |
| 1 | 2.9645 | 0.1546 | 1.58913 | 61.1 |
| 2 | 12.7739 | 0.0041 |  |  |
| 3 | 2.0214 | 0.0488 | 1.80610 | 40.9 |
| 4 | 0.6757 | 0.3091 |  |  |
| 5 | 14.6011 | 0.0529 | 1.67790 | 50.7 |
| 6 | 1.1185 | 0.1737 |  |  |
| 7 | 1.0523 | 0.1114 | 1.80518 | 25.4 |
| 8 | 2.1592 | 0.6516 |  |  |
| 9 | 1.7350 | 0.3063 | 1.80610 | 40.9 |
| 10 | −8.4074 | 0.0549 |  |  |
| 11 | 0.8439 | 0.1041 | 1.79952 | 42.2 |
| 12 | 3.3875 | 0.0927 |  |  |
| 13 | −2.3504 | 0.1594 | 1.84666 | 23.9 |
| 14 | 0.8386 | 0.0732 |  |  |
| 15 | −9.5985 | 0.0915 | 1.51633 | 64.1 |
| 16 | −1.1917 | 0.0041 |  |  |
| 17 | 30.7196 | 0.1301 | 1.51633 | 64.1 |
| 18 | −0.9926 |  |  |  |

(first lens group: surfaces 1–8; second lens group: surfaces 9–18)

| focal length of the overall lens system | $d_8$ |
|---|---|
| 1.00 | 0.6516 |
| 1.20 | 0.3739 |
| 1.46 | 0.1280 |

The eighteenth surface is aspherical.
$A_1 = 0.634163 \times 10^{-1}$
$A_2 = 0.109390$
$A_3 = 0.470527$
$A_4 = -5.122549$ The stop diaphragm is arranged at 0.0651 before the ninth surface.

| Surface No. | h | α | h̄ | ᾱ |
|---|---|---|---|---|
|  |  | 0.000 |  | −1.000 |
| 1 | 1.000 | 0.199 | −0.801 | −1.159 |
| 2 | 0.981 | 0.153 | −0.688 | −1.127 |
| 3 | 0.980 | 0.544 | −0.683 | −1.400 |
| 4 | 0.965 | −0.607 | −0.645 | −0.630 |
| 5 | 1.153 | −0.554 | −0.451 | −0.651 |
| 6 | 1.170 | −1.263 | −0.430 | −0.390 |
| 7 | 1.390 | −0.200 | −0.362 | −0.667 |
| 8 | 1.402 | −0.723 | −0.321 | −0.548 |
| Diaphragm surface | 1.826 | −0.723 | 0.000 | −0.548 |
| 9 | 1.873 | 0.148 | 0.036 | −0.531 |
| 10 | 1.848 | 0.325 | 0.126 | −0.519 |
| 11 | 1.830 | 2.059 | 0.154 | −0.373 |
| 12 | 1.711 | 1.655 | 0.176 | −0.414 |
| 13 | 1.558 | 1.094 | 0.214 | −0.492 |
| 14 | 1.463 | −0.384 | 0.257 | −0.751 |
| 15 | 1.491 | −0.464 | 0.312 | −0.768 |
| 16 | 1.519 | 0.194 | 0.358 | −0.612 |
| 17 | 1.518 | 0.220 | 0.360 | −0.606 |
| 18 | 1.500 | 1.000 | 0.412 | −0.392 |

$f_1 = -1.384$
$l_{II'} = 0.6516$
$L = 4.022$
$\phi_{18} = -0.26195$
$\Delta IV = -0.1000$
$\Delta V = -0.02747$

EXAMPLE 4

| 1:4.0 f = 1.0–1.40 ω = 47.3°–37.7° | | | | |
|---|---|---|---|---|
| Surface No. | r | d | N | υ |
| 1 | 2.5388 | 0.2441 | 1.48749 | 70.1 |
| 2 | 6.5644 | 0.0049 |  |  |
| 3 | 1.6844 | 0.0879 | 1.80400 | 46.6 |
| 4 | 0.6835 | 0.4150 |  |  |
| 5 | −9.7648 | 0.0732 | 1.80400 | 46.6 |
| 6 | 1.2853 | 0.1992 |  |  |
| 7 | 1.3068 | 0.1367 | 1.80518 | 25.4 |
| 8 | 3.8921 | 0.5273 |  |  |
| 9 | 6.6455 | 0.2529 | 1.83400 | 37.2 |
| 10 | −2.7428 | 0.1270 |  |  |
| 11 | 1.6557 | 0.1499 | 1.83400 | 37.2 |
| 12 | 27.9064 | 0.0859 |  |  |
| 13 | −0.9111 | 0.1445 | 1.84666 | 23.9 |
| 14 | −1.6620 | 0.0327 |  |  |
| 15 | −2.4266 | 0.1108 | 1.50048 | 65.9 |
| 16 | −1.1002 | 0.0273 |  |  |
| 17 | −16.1119 | 0.1382 | 1.84666 | 23.9 |
| 18 | 1.4403 | 0.0923 |  |  |
| 19 | −5.2884 | 0.1465 | 1.50048 | 65.9 |
| 20 | −0.9789 | 0.0049 |  |  |
| 21 | −4.5065 | 0.1465 | 1.51821 | 65.0 |
| 22 | −2.2867 |  |  |  |

(first lens group: surfaces 1–8; second lens group: surfaces 9–22)

| focal length of the overall lens system | $d_8$ |
|---|---|
| 1.00 | 0.5273 |
| 1.20 | 0.2227 |
| 1.40 | 0.0226 |

The third surface is aspherical.
$A_1 = 0.409896 \times 10^{-1}$
$A_2 = 0.593034 \times 10^{-2}$
$A_3 = -0.167327 \times 10^{-1}$
$A_4 = 0.157683 \times 10^{-1}$ The stop diaphragm surface is arranged at 0.0684 before the eleventh surface.

| Surface No. | h | α | h̄ | ᾱ |
|---|---|---|---|---|
|  |  | 0.000 |  | −1.000 |

-continued

| Surface No. | h | α | $\bar{h}$ | $\bar{\alpha}$ |
|---|---|---|---|---|
| 1 | 1.000 | 0.193 | −1.020 | −1.197 |
| 2 | 0.968 | 0.121 | −0.824 | −1.135 |
| 3 | 0.968 | 0.585 | −0.819 | −1.528 |
| 4 | 0.940 | −0.526 | −0.745 | −0.647 |
| 5 | 1.157 | −0.622 | −0.478 | −0.608 |
| 6 | 1.182 | −1.365 | −0.453 | −0.323 |
| 7 | 1.452 | −0.465 | −0.389 | −0.564 |
| 8 | 1.487 | −0.775 | −0.347 | −0.492 |
| 9 | 1.872 | −0.539 | −0.103 | −0.505 |
| 10 | 1.960 | 0.061 | −0.020 | −0.511 |
| Diaphragm surface | 1.957 | 0.061 | 0.000 | −0.511 |
| 11 | 1.954 | 1.051 | 0.030 | −0.496 |
| 12 | 1.869 | 0.994 | 0.070 | −0.498 |
| 13 | 1.784 | −0.673 | 0.113 | −0.603 |
| 14 | 1.836 | 0.268 | 0.160 | −0.521 |
| 15 | 1.827 | −0.111 | 0.176 | −0.558 |
| 16 | 1.835 | 0.729 | 0.217 | −0.459 |
| 17 | 1.816 | 0.633 | 0.230 | −0.471 |
| 18 | 1.768 | −0.413 | 0.265 | −0.627 |
| 19 | 1.806 | −0.585 | 0.322 | −0.658 |
| 20 | 1.863 | 0.373 | 0.386 | −0.459 |
| 21 | 1.861 | 0.589 | 0.389 | −0.414 |
| 22 | 1.805 | 1.000 | 0.428 | −0.317 |

$f_1 = -1.298$
$l_u = 0.5273$
$L = 4.952$
$\phi_1 = 0.26365$
$\Delta IV = 0.1657$
$\Delta V = -0.1402$

What is claimed is:

1. A miniaturized, super-wide angle zoom lens system, comprising:
   (a) a first divergent lens group having at least two positive and two negative lenses and including, in order from the object side, a positive lens having a convex surface facing the object, a negative lens group, and a positive meniscus lens having a convex surface facing the object, and
   (b) a second convergent lens group having at least two positive lenses on each end facing both the object and the image,
   (c) a surface of a single one of the lenses in the system being aspherical, and
   (d) the overall lens system satisfying the following conditions:

$f_W < |f_1| < 1.5 f_T$, (1)

$0.4 < l_W/f_W < 1.0$, (2)

$3.0 < L/f_W < 6.0$, (3)

if $K = i$ or $j$ (the K-th surface is aspherical), $0 < |\phi_K| < 0.35$, (4)

where: $\phi_i > 0$ and $\phi_j < 0$, $0 < |h_{WK}^2 \overline{h_{WK}}^2 \phi_K| < 0.2$, (5)

$-0.2 < h_{WK} \overline{h_{WK}}^3 \phi_K < 0$, (6)

wherein:
   $f_1$ is the focal length of the first lens group,
   $f_W$ is the focal length in the wide angle position,
   $f_T$ is the focal length in the telescopic or narrow angle position,
   $l_W$ is the distance between the first and second lens groups in the wide angle position,
   L is the maximum overall length,
   $\phi_K$ is the solid or cubic aspherical coefficient,
   $h_{WK}$ is the height of the parallel light beam near the optical axis passing through the K-th surface in the wide angle position and limited by the stop diaphragm,
   $\overline{h}_{WK}$ is the height of the angled light beam passing through the center of the stop diaphragm in the wide angle position in the K-th lens surface, i is the i-th surface when the aspherical surface is in the first lens group, and j is the j-th surface when the aspherical surface is in the second lens group, (7)
1 : 3.5 f = 1.0 − 1.46 ω = 42.0°−31.3°

| | Surface No. | r | d | N | υ |
|---|---|---|---|---|---|
| first lens group | 1 | 2.6083 | 0.1464 | 1.58913 | 61.1 |
| | 2 | 8.3382 | 0.0041 | | |
| | 3 | 2.0830 | 0.0488 | 1.79952 | 42.2 |
| | 4 | 0.6508 | 0.3091 | | |
| | 5 | 13.9462 | 0.0529 | 1.67790 | 50.7 |
| | 6 | 1.3168 | 0.1952 | | |
| | 7 | 1.0677 | 0.1114 | 1.80518 | 25.4 |
| | 8 | 1.9415 | 0.6480 | | |
| second lens group | 9 | 1.7490 | 0.2916 | 1.80610 | 40.9 |
| | 10 | −6.6348 | 0.0907 | | |
| | 11 | 0.8200 | 0.1041 | 1.80610 | 40.9 |
| | 12 | 2.6537 | 0.0936 | | |
| | 13 | −2.3505 | 0.1594 | 1.84666 | 23.9 |
| | 14 | 0.8293 | 0.0732 | | |
| | 15 | −8.5416 | 0.0915 | 1.51633 | 64.1 |
| | 16 | −0.9506 | 0.0041 | | |
| | 17 | 14.4470 | 0.0944 | 1.51633 | 64.1 |
| | 18 | −1.2857, | | | | wherein:
ω is the half-viewing angle,
r is the radius of curvature,
d is the thickness of the lens or the distance between adjacent lenses,
N is the refractive index at the d-line, and
υ is the Abbé number [,], and (8) the third surface being aspherical and its coefficients being:
$A_1 = 0.975539 \times 10^{-2}$
$A_2 = 0.159788 \times 10^{-1}$
$A_3 = -0.839908 \times 10^{-2}$
$A_4 = -0.703569 \times 10^{-3}$ 2. A miniaturized, super-wide angle zoom lens system, comprising:
   (a) a first divergent lens group having at least two positive and two negative lenses and including, in order from the object side, a positive lens having a convex surface facing the object, a negative lens group, and a positive meniscus lens having a convex surface facing the object, and
   (b) a second convergent lens group having at least two positive lenses on each end facing both the object and the image,
   (c) a surface of a single one of the lenses in the system being aspherical, and
   (d) the overall lens system satisfying the following conditions:

$f_W < |f_1| < 1.5 f_T$, (1)

$0.4 < l_W/f_W < 1.0$, (2)

$3.0 < L/f_W < 6.0$, (3)

if $K = i$ or $j$ (the K-th surface is aspherical), $0 < |\phi_K| < 0.35$, (4)

where: $\phi_i > 0$ and $\phi_j < 0$, $$0 < |h_{WK}^2 \overline{h_{WK}}^2 \phi_K| < 0.2, \quad (5)$$

$$-0.2 < h_{WK} \overline{h_{WK}}^3 \phi_K < 0, \quad (6)$$

wherein:
$f_1$ is the focal length of the first lens group,
$f_W$ is the focal length in the wide angle position,
$f_T$ is the focal length in the telescopic or narrow angle position,
$l_W$ is the distance between the first and second lens groups in the wide angle position,
L is the maximum overall length,
$\phi_K$ is the solid or cubic aspherical coefficient,
$h_{WK}$ is the height of the parallel light beam near the optical axis passing through the k-th surface in the wide angle position and limited by the stop diaphragm,
$\overline{h_{WK}}$ is the height of the angled light beam passing through the center of the stop diaphragm in the wide angle position in the K-th lens surface, i is the i-th surface when the aspherical surface is in the first lens groups, and j is the j-th surface when the aspherical surface is in the second lens group, (7)

$1 : 3.5 \ f = 1.0 - 1.46 \ \omega = 42.0° - 31.3°$

| | Surface No. | r | d | N | v |
|---|---|---|---|---|---|
| first lens group | 1 | 2.9614 | 0.1422 | 1.58913 | 61.1 |
| | 2 | 9.1414 | 0.0041 | | |
| | 3 | 1.8778 | 0.0488 | 1.80610 | 40.9 |
| | 4 | 0.6423 | 0.3088 | | |
| | 5 | 7.1790 | 0.0528 | 1.67790 | 50.7 |
| | 6 | 1.2023 | 0.1881 | | |
| | 7 | 1.1365 | 0.1219 | 1.80518 | 25.4 |
| | 8 | 2.2346 | 0.6412 | | |
| | 9 | 1.7117 | 0.2832 | 1.80610 | 40.9 |
| | 10 | −5.6534 | 0.0926 | | |
| | 11 | 0.8377 | 0.1016 | 1.80610 | 40.9 |
| | 12 | 2.6212 | 0.0913 | | |
| second lens group | 13 | −2.1878 | 0.1593 | 1.84666 | 23.9 |
| | 14 | 0.8525 | 0.0731 | | |
| | 15 | −8.3985 | 0.0914 | 1.51633 | 64.1 |
| | 16 | −0.9428 | 0.0041 | | |
| | 17 | −34.2275 | 0.0943 | 1.51633 | 64.1 |
| | 18 | −1.1567 | | | | wherein:
$\omega$ is the half-viewing angle,
r is the radius of curvature,
d is the thickness of the lens or the distance between the adjacent lenses,
N is the refractive index at the d-line, and
$v$ is the Abbé number, and (8) the seventh surface being aspherical and its coefficients being:
$A_1 = 0.252119 \times 10^{-1}$
$A_2 = 0.104986$
$A_3 = 0.200580$
$A_4 = -0.338823$ 3. A miniaturized, super-wide angle zoom lens system, comprising:
(a) a first divergent lens group having at least two positive and two negative lenses and including, in order from the object side, a positive lens having a convex surface facing the object, a negative lens groups, and a positive meniscus lens having a convex surface facing the object, and (b) a second convergent lens group having at least two positive lenses on each end facing both the object and the image,
(c) a surface of a single one of the lenses in the system being aspherical, and
(d) the overall lens system satisfying the following conditions:

$$f_W < |f_1| < 1.5 \ f_T, \quad (1)$$

$$0.4 < l_W/f_W < 1.0, \quad (2)$$

$$3.0 < L/f_W < 6.0, \quad (3)$$

if K = i or j (the K-th surface is aspherical), $$0 < |\phi_K| < 0.35, \quad (4)$$

where: $\phi_i > 0$ and $\phi_j < 0$, $$0 < |h_{WK}^2 \overline{h_{WK}}^2 \phi_K| < 0.2, \quad (5)$$

$$-0.2 < h_{WK} \overline{h_{WK}}^3 \phi_K < 0, \quad (6)$$

wherein:
$f_1$ is the focal length of the first lens group,
$f_W$ is the focal length in the wide angle position,
$f_T$ is the focal length in the telescopic or narrow angle position,
$l_W$ is the distance between the first and second lens groups in the wide angle position,
L is the maximum overall length,
$\phi_K$ is the solid or cubic aspherical coefficient,
$h_{WK}$ is the height of the parallel light beam near the optical axis passing through the K-th surface in the wide angle position and limited by the stop diaphragm,
$\overline{h_{WK}}$ is the height of the angled light beam passing through the center of the stop diaphragm in the wide angle position in the K-th lens surface, i is the i-th surface when the aspherical surface is in the first lens group, and j is the j-th surface when the aspherical surface is in the second lens group, (7)

$1 : 3.5 \ f = 1.0 - 1.46 \ \omega = 42.0° - 31.3°$

| | Surface No. | r | d | N | v |
|---|---|---|---|---|---|
| first lens group | 1 | 2.9645 | 0.1546 | 1.58913 | 61.1 |
| | 2 | 12.7739 | 0.0041 | | |
| | 3 | 2.0214 | 0.0488 | 1.80610 | 40.9 |
| | 4 | 0.6757 | 0.309⊦ | | |
| | 5 | 14.6011 | 0.0529 | 1.67790 | 50.7 |
| | 6 | 1.1185 | 0.1737 | | |
| | 7 | 1.0523 | 0.1114 | 1.80518 | 25.4 |
| | 8 | 2.1592 | 0.6516 | | |
| | 9 | 1.7350 | 0.3063 | 1.80610 | 40.9 |
| second lens group | 10 | 8.4074 | 0.0549 | | |
| | 11 | 0.8439 | 0.1041 | 1.79952 | 42.2 |
| | 12 | 3.3875 | 0.0927 | | |
| | 13 | −2.3504 | 0.1594 | 1.84666 | 23.9 |
| | 1 | 0.8386 | 0.0732 | | |
| | 15 | −9.5985 | 0.0915 | 1.51633 | 64.1 |
| | 16 | −1.1917 | 0.0041 | | |
| | 17 | 30.7196 | 0.1301 | 1.51633 | 64.1 |
| | 18 | −0.9926. | | | | wherein:
$\omega$ is the half-viewing angle,
r is the radius of curvature,
d is the thickness of the lens or the distance between adjacent lenses,
N is the refractive index at the d-line, and
$v$ is the Abbé number [, ], and (8) the eighteenth surface being aspherical and its coefficients being:

$A_1 = 0.634163 \times 10^{-1}$
$A_2 = 0.109390$
$A_3 = 0.470527$
$A_4 = -5.122549$.

4. A miniaturized, super-wide angle zoom lens system, comprising:

(a) a first divergent lens group having at least two positive and two negative lenses and including, in order from the object side, a positive lens having a convex surface facing the object, a negative lens group, and a positive meniscus lens having a convex surface facing the object, and (b) a second convergent lens group having at least two positive lenses on each end facing both the object and the image, (c) a surface of a single one of the lenses in the system being aspherical, and (d) the overall lens system satisfying the following conditions:

$$f_W < |f_1| < 1.5 \, f_T, \quad (1)$$

$$0.4 < l_W/f_W < 1.0, \quad (2)$$

$$3.0 < L/f_W < 6.0, \quad (3)$$

if $K = i$ or $j$ (the K-th surface is aspherical), $$0 < |\phi_K| < 0.35, \quad$$

where: $\phi_i > 0$ and $\phi_j < 0$, $$0 < |h_{WK}^2 \overline{h_{WK}}^2 \phi_K| < 0.2, \quad (5)$$

$$-0.2 < h_{WK} \overline{h_{WK}}^3 \phi_K < 0, \quad (6)$$

wherein:

$f_1$ is the focal length of the first lens group,
$f_W$ is the focal length in the wide angle position,
$f_T$ is the focal length in the telescopic or narrow angle position,
$l_W$ is the distance between the first and second lens groups in the wide angle position,
L is the maximum overall length,
$\phi_K$ is the solid or cubic aspherical coefficient,
$h_{WK}$ is the height of the parallel light beam near the optical axis passing through the K-th surface in the wide angle position and limited by the stop diaphragm,
$\overline{h_{WK}}$ is the height of the angled light beam passing through the center of the stop diaphragm in the wide angle position in the K-th lens surface, i is the i-th surface when the aspherical surface is in the first lens group, and j is the j-th surface when the aspherical surface is in the second lens group, (7) $1 : 4.0 \; f = 1.0 \; 1.40 \; \omega = 3°\text{-}37.7°$

| | Surface No. | r | d | N | υ |
|---|---|---|---|---|---|
| first lens group | 1 | 2.5388 | 0.2441 | 1.48749 | 70.1 |
| | 2 | 6.5644 | 0.0049 | | |
| | 3 | 1.6844 | 0.0879 | 1.80400 | 46.6 |
| | 4 | 0.6835 | 0.4150 | | |
| | 5 | −9.7648 | 0.0732 | 1.80400 | 46.6 |
| | 6 | 1.2853 | 0.1992 | | |
| | 7 | 1.3068 | 0.1367 | 1.80518 | 25.4 |
| | 8 | 3.8921 | 0.5273 | | |
| | 9 | 6.6455 | 0.2529 | 1.83400 | 37.2 |
| second lens group | 10 | −2.7428 | 0.1270 | | |
| | 11 | 1.6557 | 0.1499 | 1.83400 | 37.2 |
| | 12 | 27.9064 | 0.0859 | | |
| | 13 | −0.9111 | 0.1445 | 1.84666 | 23.9 |
| | 14 | −1.6620 | 0.0327 | | |
| | 15 | −2.4266 | 0.1108 | 1.50048 | 65.9 |
| | 16 | −1.1002 | 0.0273 | | |
| | 17 | −16.1119 | 0.1382 | 1.84666 | 23.9 |
| | 18 | 1.4403 | 0.0923 | | |
| | 19 | −5.2884 | 0.1465 | 1.50048 | 65.9 |
| | 20 | −0.9789 | 0.0049 | | |
| | 21 | 4.5065 | 0.1465 | 1.51821 | 65.0 |
| | 22 | −2.2867 | | | |

ω is the half-viewing angle,
r is the radius of curvature,
d is the thickness of the lens or the distance between adjacent lenses,
N is the refractive index at the d-line, and
υ is the Abbé number, and (8) the third surface being aspherical and its coefficients being:

$A_1 = 0.409896 \times 10^{-1}$
$A_2 = 0.593034 \times 10^{-2}$
$A_3 = -0.167327 \times 10^{-1}$
$A_4 = 0.157683 \times 10^{-1}$.

* * * * *